United States Patent [19]

Neugebauer et al.

[11] Patent Number: 4,906,704

[45] Date of Patent: Mar. 6, 1990

[54] FUNCTIONALIZED OLEFINIC POLYMERS, AND METHOD OF MANUFACTURING THE SAME

[75] Inventors: Wolfgang Neugebauer, Dülmen; Joachim Muegge, Haltern; Michael Schlobohm, Marl, all of Fed. Rep. of Germany

[73] Assignee: Huels Aktiengesellschaft, Marl, Fed. Rep. of Germany

[21] Appl. No.: 277,937

[22] Filed: Nov. 30, 1988

[30] Foreign Application Priority Data

Feb. 11, 1988 [DE] Fed. Rep. of Germany ....... 3804185

[51] Int. Cl.$^4$ .................................................. C08F 8/30
[52] U.S. Cl. ............................... 525/331.7; 525/332.1; 525/332.8; 525/332.9; 525/333.1; 525/333.2; 525/333.6; 525/333.7; 525/375; 525/379; 525/380
[58] Field of Search ............ 525/375, 379, 380, 331.7, 525/332.1, 332.8, 332.4, 333.1, 333.2, 333.6, 333.7

[56] References Cited

U.S. PATENT DOCUMENTS 4,273,897 6/1981 Onizawa .............................. 525/380
4,604,451 8/1986 Harada et al. ...................... 525/375

Primary Examiner—Joseph L. Schofer
Assistant Examiner—Bernard Lipman
Attorney, Agent, or Firm—Oblon, Spivak, McClelland, Maier & Neustadt

[57] ABSTRACT

A method of functionalizing a thermoplastically processible olefinic polymer, comprising the step of:
reacting in a melt, an olefinic polymer with a functionalizing agent having the formula

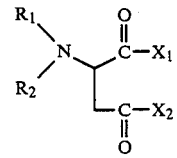

wherein
$X_1$ and $X_2$ are, independently, a OH group, a $C_{1-10}$ alkoxy group, the group $NR_1R_2$, or $X_1$ and $X_2$, taken together, are oxygen or the group $-NR_1-$; wherein $R_1$ and $R_2$ are, independently, hydrogen, a $C_{1-10}$ (cyclo)alkyl group, a $C_{1-10}$ hydroxyalkyl group, an aryl group with up to 10 carbon atoms, a $C_{1-10}$ acyl group, or $R_1$ and $R_2$, taken together, are a $C_{2-9}$ unsubstituted or hydroxyl substituted alkylene group.

9 Claims, No Drawings

FUNCTIONALIZED OLEFINIC POLYMERS, AND METHOD OF MANUFACTURING THE SAME

BACKGROUND OF THE INVENTION

1. Field of the Invention:

The invention relates to functionalized olefinic polymers and a method of functionalizing thermoplastically processible olefinic polymers which themselves bear no functional groups.

2. Description of the Background:

A general disadvantage of all olefinic polymers is their general incompatibility with polycondensates containing a high proportion of polar groups, e.g. polyesters, polyamides, and polycarbonates. This situation is of particular concern because polyolefins, rubbers, etc. can substantially improve the impact resistance (under the notched bar test) of the polycondensates if there is good compatibility.

There are essentially two approaches by which the compatibility of polyolefins, rubbers, etc. with the polycondensates can be improved:

(1) The copolymer to be optimized is specially synthesized for the given application purpose, wherewith it contains comonomers which are chosen to improve the compatibility. This approach is very costly, because it necessitates manufacture of special products in small production amounts.

(2) One starts with readily available olefinic polymers, and functionalizes these by reacting them with monomeric alpha-beta-unsaturated carboxylic acids, anhydrides, or esters. This approach is fundamentally more advantageous. The reaction is sometimes referred to as "grafting". It may be carried out in solution or in the melt. In a number of cases it is desirable to add radical forming compounds such as azodiisobutyronitrile, di-tert-butyl peroxide, cumyl hydroperoxide, or dicumyl peroxide.

Thus, U.S. Pat. No. 3,236,917 and 3,862,265 describe grafting of unsaturated acid anhydrides to polyolefins in a roll mill and/or in the presence of a radical initiator, whereby the polyolefin becomes crosslinked. U.S. Pat. No. 3,873,643 discloses a polymeric material comprised of polyolefins with (poly)cyclic acid or anhydride groups grafted onto it, which material is manufactured in an extruder or a roll mill.

The subject of U.S. Pat. No. 3,882,194 is a method wherein a mixture of an unsaturated carboxylic acid ester and an unsaturated carboxylic acid (or anhydride of the same) is employed for grafting, preferably with the aid of peroxides.

The method described in U.S. Pat. No. 4,026,967 is distinguished in that at temperatures between 350° and 500° C. it brings about a rapid uncatalyzed reaction between a polyolefin and an unsaturated compound, e.g. fumaric acid. The substantial increase in melt index can be considered an indication that the polyolefins have been at least partially degraded.

Ger. OS No. 22 16 718 describes the addition of liquid unsaturated monomers such as, e.g., maleic acid anhydride, styrene, and acrylic acid, to a polyolefin melt in an extruder at elevated temperatures. As a rule, a peroxide is added at the same time. The method is feasible only if means are provided to nearly quantitatively remove the unreacted monomers.

Ger. OS No. 24 01 149 describes partial reaction of an EPDM rubber with maleic anhydride at temperatures up to 350° C.

The previously known methods of functionalizing olefinic polymers all have drawbacks, i.e., (a) The reaction requires, as a rule, drastic reaction conditions. Typically the reaction is carried out in the melt at 200°–500° C. As a result, the toxic alpha-beta-unsaturated compounds are partially vaporized and pose a hazard to the operating personnel.

(b) In many cases, the reaction can be carried out in solution; however, it is unavoidably necessary to add radical formers. The molecular weight undergoes changes in the presence of free radicals, as a result of crosslinking or degradation reactions (see Ger. Pat. No. 2,216,718).

(c) A large number of commonly used acids and anhydrides are very corrosive. Therefore if they are used it is necessary to employ special protective measures.

(d) The esters are in general too volatile, and, because of the limited reactivity of the ester group, the esters are often incompatible with polycondensates.

(e) Even when radical initiators are added, the reaction seldom proceeds quantitatively.

A need continues to exist, therefore, for a better method of functionalizing olefinic polymers.

SUMMARY OF THE INVENTION

Accordingly, one an object of the invention is to provide a method for producing functionalized thermoplastically processible olefinic polymers without having to tolerate the disadvantages listed above.

A second object of the invention is to provide functionalized olefinic polymers which are suitable for use in improving the impact strength (by the notched-bar impact test) of polycondensates.

These and other objects which will become apparent from the following specification have been achieved by the present method of functionalizing a thermoplastically processible olefinic polymer, which comprises the step of:

reacting in a melt, an olefinic polymer with a functionalizing agent having the formula

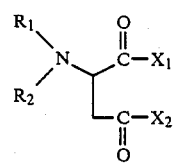

wherein $X_1$ and $X_2$ are, independently, a OH group, a $C_{1-10}$ alkoxy group, the group $NR_1R_2$, or $X_1$ and $X_2$, taken together, are oxygen or the group $—NR_1—$; where $R_1$ and $R_2$ are, independently, hydrogen, a $C_{1-10}$ (cyclo)alkyl group, a $C_{1-10}$ hydroxyalkyl group, an aryl group with up to 10 carbon atoms, a $C_{1-10}$ acyl group, or $R_1$ and $R_2$, taken together, are a $C_{2-9}$ unsubstituted or hydroxyl-substituted alkylene group, and the functionalized olefinic polymers produced by this process.

DETAILED DESCRIPTION OF THE PREFERRED EMBODIMENTS

A surprising new technique for functionalizing olefinic polymers has been discovered in connection with the invention. The technique consists of employing a polymer of at least one monomer from the group of olefins, dienes, and vinylaromatic compounds; and using as the functionalizing agents, aspartic acid or an aspartic acid derivative of general formula

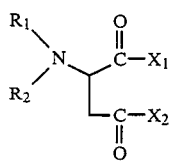

The polymer is preferably a polyalkenylene, particularly a polyoctenylene, or an EP(D)M rubber.

Preferred candidates for use as the aspartic acid component are aspartic acid itself, esters of aspartic acid or N-substituted aspartic acids with 2 equivalents of an alcohol with up to 10 carbon atoms. Preferably, 0.1-4 wt. % of the aspartic acid component is employed with 99.9-96 wt. % of the polymer.

The reaction is preferably carried out at about 180°-320° C., optionally in the presence of a catalyst and/or a stabilizing agent. The present invention also includes olefinic polymers prepared according to this method.

The chief advantage of the present method is that no toxic or corrosive compounds are required to accomplish the functionalization. The functionalization can be conducted without problems in conventionally equipped mixers for polymer melts.

In the context of the invention, an "olefinic polymer" will be understood to be a resin with a molecular weight of 10,000-300,000 which contains no functional groups. As a rule it has a linear structure; but it may also be branched. For every four carbon atoms in the main polymer chain, the polymer should contain at most one olefinic double bond. In particular, the olefinic polymers are of the following polymer classes:

I. Polyalkenylenes prepared by ring-opening polymerization of cycloolefins with 5-12 carbon atoms; e.g., polypentenylene, polydodecenylene, and particularly polyoctenylenes (see Ivin, K. J., and Sagusa, T., 1984, "Ring-opening polymerization", Vol. 1, pub. Elsevier Appl. Sci. Publishers, London, especially pp. 121-183).

Preferred polyalkenylenes are polyoctenylenes with a viscosity index of 50-350 ml/g, particularly 80-160 ml/g, determined with a 0.1 wt. % toluene solution, and with a proportion of trans-double bonds of 55-95%, preferably 75-85%.

II. An EPM rubber, for example prepared in known fashion by polymerization of a mixture of ethylene (25-75 wt. %) and propylene (75-25 wt. %) in the presence of a Ziegler-Natta catalyst, e.g. diethylaluminum chloride.

An EPDM rubber, for example prepared analogously by polymerization of a mixture comprised of ethylene (>5 wt. %), propylene (>25 wt. %), and a diene (1--10 wt. %, preferably 1-3 wt. %). The diene should not be conjugated. Preferred dienes are 1,4-hexadiene and dicyclopentadiene. A particularly preferred diene is 5-ethylidene-2-norbornene (see 1979 Kirk-Othmer "Encyclopedia of Chemical Technology", 3rd Ed., Vol. 8, pp. 492-500).

III. Polyethylenes and polypropylenes.

IV. Polymers of conjugated dienes, such as polybutadiene, polyisoprene, and poly(2,3-dimethylbutadiene).

V. Butadiene-styrene copolymers. The proportion of styrene is not critical. It may be between 0% (as in IV, supra) and 100% (as in VI). Block, graft, and statistical copolymers are acceptable.

VI. Polystyrenes.

The aspartic acid compound is either aspartic acid itself or a derivative of general formula

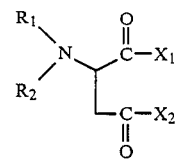

where $X_1$ and $X_2$, independently, represent an OH group, an alkoxy group with 1-10 carbon atoms, or the group $NR_1R_2$, or taken together, represent oxygen or the group $-NR_1-$; and $R_1$ and $R_2$, independently, represent hydrogen, a (cyclo)alkyl group with 1-10 carbon atoms, a hydroxyalkyl group with 1-10 carbon atoms, an aryl group with up to 10 carbon atoms, or an acyl group with up to 10 carbon atoms, or together represent an alkylene group with 2-9 carbon atoms, optionally containing hydroxyl groups.

The functionalization is carried out in the melt at between 180° and 320° C., preferably between 220° and 300° C. The olefinic polymer is premixed dry with the aspartic acid derivative, and then the mixture is melted in a kneading-type apparatus, e.g. an extruder. Alternatively, the aspartic acid derivative may be charged as a liquid directly into the melt of the olefinic polymer, e.g. via a dosing device for softening agents. Preferably, the melting is followed by degassing, preferably under application of a vacuum, to remove volatile byproducts such as water or n-butanol.

Other features of the invention will become apparent in the course of the following descriptions of exemplary embodiments which are given for illustration of the invention and are not intended to be limiting thereof.

EXAMPLES

Example 1

100 parts EPDM (Buna ® AP 437, supplied by Bunawerke Huels AG) was extruded on a Leistritz LSM 30.34 double screw extruder, with a temperature profile between 200° and 280° C., during which 2.0 parts N-(2hydroxyethyl)aspartic acid dibutyl ester (HAB) (prepared by Michael addition of ethanolamine to maleic acid dibutyl ester) was dosed in liquid form to the melt. To remove the n-butanol produced, a vacuum of 100 mbar was applied. The extruded material was cooled in water and granulated. 5 g of the resulting functionalized EPDM rubber was reprecipitated twice from toluene-/acetone. There was an appreciable IR absorption peak at 1700 cm$^{-1}$. The elemental analysis showed 0.072% N (theoretical=0.097%).

Example 2

100 parts polyoctenylene (Vestenamer ® 8012, supplied by Huels AG) was premixed with 2 parts aspartic acid, and the mixture was extruded on the same apparatus as in Example 1, at 290° C. The extrudate was cooled and granulated. 5 g of the resulting polymer was reprecipitated twice from toluene/acetone. There was an appreciable IR absorption peak at 1700 cm$_{-1}$. The elemental analysis showed 0.19% N (theoretical=0.21%).

Example 3

100 parts high density polyethylene (Vestolen ® A 5042, supplied by Huels AG) was functionalized with 2 parts aspartic acid, analogously to Example 2.

Example 4

100 parts EPDM (Buna ® AP 537, supplied by Bunawerke Huels AG) was functionalized with 2 parts aspartic acid, analogously to Example 2.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A method of functionalizing a thermoplastically processible olefinic polymer, comprising the step of:

reacting in a melt at a temperature of about 180°–320° C., 99.9–96 wt. % of an olefinic polymer with 0.1–4 wt. % of a functionalizing agent having the formula

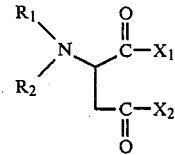

wherein $X_1$ and $X_2$ are, independently, a OH group, a $C_{1-10}$ alkoxy group, the group $NR_1R_2$, or $X_1$ and $X_2$, taken together, are oxygen or the group $-NR_1-$; wherein $R_1$ and $R_2$ are, independently, hydrogen, a $C_{1-10}$ (cyclo)alkyl group, a $C_{1-10}$ hydrooyalkyl group, an aryl group with up to 10 carbon atoms, a $C_{1-10}$ acyl group, or $R_1$ and $R_2$, taken together, are a $C_{2-9}$ unsubstituted or hydroxyl substituted alkylene group.

2. The method of claim 1, wherein said olefinic polymer is selected from the group consisting of polyalkenylenes prepared from $C_{1-12}$ cycloolefins, EPM rubbers, EPDM rubbers, polyethylenes, polypropylenes, polymers of conjugated dienes, butadiene-styrene copolymers and polystyrenes.

3. The method of claim 2, wherein said olefinic polymer is a polyalkylene prepared from a $C_{5-12}$ cyclo olefin.

4. The method of claims 3, wherein said olefinic polymer is polyoctenylene.

5. The method of claim 1, wherein said olefinic polymer is an EPM rubber or an EPDM rubber.

6. The method of claim 1, wherein $X_1$ and $X_2$ are each a OH group or a $C_{1-4}$ alkoxy group.

7. The method of claim 1, wherein $R_1$ is hydrogen and $R_2$ is a hydroxyalkyl group.

8. The method of claim 1, wherein a catalyst or stabilizing agent is added during said reacting step.

9. The functionalized olefinic polymer obtained by the method of claim 1.

* * * * *